United States Patent
Lee

(10) Patent No.: US 10,403,305 B2
(45) Date of Patent: Sep. 3, 2019

(54) SERVICE PROVISION METHOD AND APPARATUS RELATED TO ELECTRONIC HARMONIC ALGORITHM CAPABLE OF COMPARING, DISTINGUISHING, AND IDENTIFYING SOUNDS OF INDIVIDUALS INFECTED WITH ANIMAL DISEASES, INCLUDING AVIAN INFLUENZA, BY MEANS OF FREQUENCY PEAK DETECT TECHNIQUE

(71) Applicant: Dong Whan Lee, Seoul (KR)

(72) Inventor: Dong Whan Lee, Seoul (KR)

( * ) Notice: Subject to any disclaimer, the term of this patent is extended or adjusted under 35 U.S.C. 154(b) by 44 days.

(21) Appl. No.: 15/819,529

(22) Filed: Nov. 21, 2017

(65) Prior Publication Data

US 2019/0088271 A1 Mar. 21, 2019

(30) Foreign Application Priority Data

Sep. 21, 2017 (KR) .................. 10-2017-0121555

(51) Int. Cl.
| | |
|---|---|
| *G06F 17/00* | (2019.01) |
| *G10L 25/66* | (2013.01) |
| *G10L 25/84* | (2013.01) |
| *G10L 17/26* | (2013.01) |
| *G10L 25/30* | (2013.01) |
| *G10L 25/72* | (2013.01) |

(Continued)

(52) U.S. Cl.
CPC .............. *G10L 25/66* (2013.01); *G10L 17/26* (2013.01); *G10L 25/30* (2013.01); *G10L 25/72* (2013.01); *G10L 25/84* (2013.01); *G10L 21/0208* (2013.01); *G10L 25/18* (2013.01); *G10L 2025/906* (2013.01)

(58) Field of Classification Search
CPC ......... G10L 25/66; G10L 25/30; G10L 25/72; G10L 25/84; G10L 25/18; G10L 17/26; G10L 21/0208; G10L 2025/906
USPC .................................................. 700/94
See application file for complete search history.

(56) References Cited

U.S. PATENT DOCUMENTS

| 5,956,463 A * | 9/1999 | Patrick ................ G10L 15/16 |
| | | 119/906 |
| 6,535,131 B1 * | 3/2003 | Bar-Shalom ......... A01K 11/008 |
| | | 340/573.1 |

(Continued)

FOREIGN PATENT DOCUMENTS

| KR | 10-2014-0146782 A | 12/2014 |
| KR | 10-2016-0120407 A | 10/2016 |

OTHER PUBLICATIONS

Brandes: "Feature Vector Selection and Use With Hidden Markov Models to Identify Frequency-Modulated Bioacoustic Signals Amidst Noise" (Year: 2008).*

(Continued)

*Primary Examiner* — Paul C McCord
(74) *Attorney, Agent, or Firm* — Korus Patent, LLC; Seong Il Jeong

(57) ABSTRACT

Disclosed herein is a system for identifying and diagnosing sounds of infected wild birds and poultry. The system includes: a multi channel audio analysis device (MCAAD); and a sound collection unit connected to the MCAAD via a wired or wireless connection. The sound collection unit collects sounds of birds via a plurality of microphones, and information about the collected sounds is transmitted to the MCAAD via a relay.

7 Claims, 13 Drawing Sheets

(51) Int. Cl.
　　　*G10L 21/0208*　　(2013.01)
　　　*G10L 25/90*　　　(2013.01)
　　　*G10L 25/18*　　　(2013.01)

(56) References Cited

U.S. PATENT DOCUMENTS

| | | | | |
|---|---|---|---|---|
| 7,454,334 | B2 * | 11/2008 | Agranat | A01K 11/008 |
| | | | | 119/713 |
| 8,838,260 | B2 * | 9/2014 | Pachet | A01K 15/02 |
| | | | | 700/94 |
| 8,932,218 | B1 * | 1/2015 | Thompson | A61B 5/7235 |
| | | | | 600/300 |
| 9,089,123 | B1 * | 7/2015 | Thomas | A01M 29/16 |
| 2010/0198023 | A1 * | 8/2010 | Yanai | G06F 19/3418 |
| | | | | 600/301 |

OTHER PUBLICATIONS

Beaver: "Some unexplained properties of bird song" (Year: 1977).*
Bardeli: "Detecting bird sounds in a complex acoustic environment" (Year: 2009).*
Brandes: "Automated sound recording and analysis techniques for bird surveys and conservation" (Year: 2008).*
Andrews: "Multimedia Signal Processing for Behavioral Quantification in Neuroscience" (Year: 2006).*
Stowell: "On-Bird Sound Recordings: Automatic Acoustic Recognition of Activities and Contexts" (Year: 2017).*
Goller: "Integrative physiology of fundamental frequency control in birds" (Year: 2012).*
Trifa: "Automated species recognition of antbirds in a Mexican rainforest using hidden Markov models" (Year: 2008).*
Kyong-Seok Ki and Chan-Yong Sung, Bioacoustic Change of Dybowski's Brown Frog by Highway Noise, Korean J. Environ. Ecol., Jun. 2014, pp. 273-280, vol. 28(Issue. 3).

* cited by examiner

SERVICE PROVISION METHOD AND APPARATUS RELATED TO ELECTRONIC HARMONIC ALGORITHM CAPABLE OF COMPARING, DISTINGUISHING, AND IDENTIFYING SOUNDS OF INDIVIDUALS INFECTED WITH ANIMAL DISEASES, INCLUDING AVIAN INFLUENZA, BY MEANS OF FREQUENCY PEAK DETECT TECHNIQUE

CROSS-REFERENCE TO RELATED APPLICATION

This application claims the benefit of Korean Patent Application No. 10-2017-0121555, filed on Sep. 21, 2017, which is hereby incorporated by reference herein in its entirety.

BACKGROUND

1. Technical Field

The present disclosure relates to a peak frequency detection method and apparatus for identifying sounds of infected wild birds and poultry and a diagnostic system using the same.

2. Description of the Related Art

During a recent period from 2016 to 2017, avian influenza broke out in Korea, and about 40 million chickens and ducts were culled, thus resulting in 400 billion won in damages. As a result, the prices of chickens and ducts have increased rapidly, the prices of eggs have also increased, and the number of imported eggs has increased. Accordingly, there is a need to find wild birds or poultry infected with a respiratory disease, such as avian influenza, in an early stage, to block the entry and exit of vehicles and humans, to accurately diagnose the infected individuals while carrying out countermeasure disinfection against the disease, and to effectively perform preemptive countermeasure activities against the disease when the birds or poultry tested positive in order to prevent the disease, such as avian influenza, from spreading from a farm, a habitat for migratory birds, or the like.

Avian influenza (AI) is an infectious respiratory disease which breaks out chiefly in birds, such as chickens, ducks, etc. Avian influenza has a weak possibility of spreading to humans. Once a human has been infected with avian influenza, lethality is high.

When the spread of avian influenza starts, emergency countermeasures against a disease are taken in habitats for migratory birds. The countries where avian influenza broke out in the period from 2014 to 2016 also include hotter countries including Laos, Vietnam, Ghana, Nigeria, etc. This means that strains of an avian influenza virus have high resistance to the warming climate.

Avian influenza is classified into non-pathogenic avian influenza which causes light respiratory signs when chickens are infected with avian influenza, low pathogenic avian influenza which causes a mortality rate of about 1 to 30% and an egg drop, and highly pathogenic avian influenza (HPAI) which exhibits a high mortality rate of 95% or higher. Avian influenza viruses are classified into types A, B, and C according to the antigenicity of matrix M protein occupying 35 to 45% of nucleoprotein NP and a virus particle. Of types A, B, and C, types B and C spread to only humans, and type A spreads to chickens, turkeys, wild ducks, pigs, horses, minks, etc., as well as humans.

Highly pathogenic avian influenza is classified as a zoonosis. There are a few cases where humans are infected with highly pathogenic avian influenza, and the lethality rate thereof ranges from 30 to 60%. Additional types of highly pathogenic AI are H5N1, and H7N9 which was found first in Anhui of China in 2013. It is uncertain whether humans are infected with H5N8 which spread in Korea in 2016. H5N6-type avian influenza broke out in 2014 in China, 15 persons were infected with H5N6-type avian influenza, and nine persons died of H5N6-type avian influenza. The risk of H5N6-type avian influenza has been recognized all over the world.

When a highly pathogenic avian influenza virus appears in a metropolitan area, possibility that pigeons, sparrows, swallows, crows, etc. are subjected to cross-infection is weak from the epidemiological point of view, but cannot be completely ruled out. Meanwhile, possibility that humans are infected with highly pathogenic avian influenza cannot be also ruled out.

As a patent application publication related to the identification of the diseases of wild birds and poultry, Korean Patent Application Publication No. 10-2014-0147230 a technology for determining the diseases of animals by means of the biological information of livestock, the temperature and humidity of a fowl run, and a thermo-vision camera.

Korean Patent No. 10-1634706 discloses a primer set for the diagnosis of an influenza virus including at least one primer set selected from a group composed of seven primer sets, and a kit for the diagnosis of an influenza virus including a primer set.

However, the conventional technologies including the above patents are intended to diagnose and prevent bird diseases from the medical point of view, and are limited in terms of the early diagnosis of diseases and the prevention of initial spread.

SUMMARY

Accordingly, an object of the present invention is to provide a service provision method and apparatus related to an electronic harmonic algorithm which can compare, distinguish, and identify sounds of individuals infected with animal diseases, including avian influenza, by means of a frequency peak detect (PFD) technique.

In order to accomplish the above object, according to an aspect of the present invention, there is provided a system for identifying and diagnosing sounds of infected wild birds and poultry, the system including: a multi channel audio analysis device (MCAAD); and a sound collection unit connected to the MCAAD via a wired or wireless connection; wherein the sound collection unit collects sounds of birds via a plurality of microphones, and information about the collected sounds is transmitted to the MCAAD via a relay.

The MCAAD may receive the information about the sounds of the birds, may filter out environmental noise, may extract effective frequencies, may determine the current state of the birds by analyzing the effective frequencies, and may transmit corresponding information to a main server when the current state is classified as an abnormal state.

The MCAAD: may classify frequencies in question as the effective frequencies when the frequencies in question exceed the environmental noise and peak frequencies of the frequencies in question equal to or higher than a predetermined decibel form an arithmetic progression or are identical to data previously stored in the MCAAD; and may determine the lowest one of the effective frequencies to be a fundamental tone.

The main server may be connected to at least one of a smartphone, a radio, a computer terminal, a tablet personal computer (PC), and a personal digital assistant (PDA).

The MCAAD may determine the state of the birds based on whether intro peak intro peak frequencies and outro peak outro peak frequencies extracted based on production time within a single syllable or phoneme in order to analyze the information about the sounds of the birds are produced while resonating at a specific harmonic of a natural harmonic series where a trachea of the birds resonates, or based on whether intro peak frequencies and outro peak frequencies resonate at different harmonics of the natural harmonic series where the trachea of the birds resonates.

The MCAAD: (A) may set fundamental tones of the intro peak frequencies and the outro peak frequencies when the birds are in a normal state as reference fundamental tones; (B) may determine the birds to have been infected with a respiratory disease virus, such as an infectious bronchitis (IB) virus, a Newcastle disease (ND) virus, or an infectious laryngotracheitis (ILT) virus when the fundamental tones of the intro peak frequencies and outro peak frequencies of the measured sounds of the birds are identical to each other and are all lower than the reference fundamental tones, respectively, or when the fundamental tone of the outro peak frequencies is lower than the fundamental tone of the intro peak frequencies and are all lower than the reference fundamental tones, respectively; and (C) may determine the birds to have been infected with avian influenza when the fundamental tone of the outro peak frequencies is higher than the fundamental tone of the intro peak frequencies of the measured sounds of the birds and are all lower than the reference fundamental tones, respectively, or when the fundamental tone of the outro peak frequencies is higher than the fundamental tone of the intro peak frequencies by a perfect eighth octave or higher.

The MCAAD may determine the birds to be in a serene state when: first and second peak frequencies of the intro peak frequencies form an arithmetic progression, and the first peak frequency which is a fundamental tone corresponds to a fourth harmonic of a natural frequency of the trachea of the birds; and first to sixth peak frequencies of the outro peak frequencies form an arithmetic progression, and the first peak frequency which is a fundamental tone corresponds to a fourth harmonic of a natural frequency of the trachea of the birds.

The MCAAD may determine the sounds of the birds to be normal loud sounds when: first to eighth peak frequencies of the intro peak frequencies form an arithmetic progression, and the first peak frequency which is a fundamental tone corresponds to a fifth harmonic of a natural frequency of the trachea of the birds; and first to fifth peak frequencies of the outro peak frequencies form an arithmetic progression, and the first peak frequency which is a fundamental tone corresponds to a fourth harmonic of a natural frequency of the trachea of the birds.

The MCAAD may determine the birds to have been infected with a respiratory disease virus, such as an infectious bronchitis (IB) virus, a Newcastle disease (ND) virus, or an infectious laryngotracheitis (ILT) virus when: (A) first to third peak frequencies of the intro peak frequencies form an arithmetic progression in a state where difference between a higher-order peak frequency and a lower-order peak frequency is a reference fundamental tone, the first peak frequency corresponds to a third harmonic of a natural frequency of a trachea of the birds, the second peak frequency corresponds to a fourth harmonic of the natural frequency of the trachea of the birds, and the third peak frequency corresponds to a fifth harmonic of the natural frequency of the trachea of the birds; and first and second peak frequencies of the outro peak frequencies form an arithmetic progression in a state where a difference between a higher-order peak frequency and a lower-order peak frequency is a reference fundamental tone, the first peak frequency corresponds to a third harmonic of the natural frequency of the trachea of the birds, and the second peak frequency corresponds to a fourth harmonic of the natural frequency of the trachea of the birds; or (B) first to fifth peak frequencies of the intro peak frequencies form an arithmetic progression, and the first peak frequency which is a fundamental tone corresponds to a second harmonic of the natural frequency of the trachea of the birds; and first to twelfth peak frequencies of the outro peak frequencies form an arithmetic progression, and the first peak frequency which is a fundamental tone corresponds to a first harmonic of the natural frequency of the trachea of the birds.

The MCAAD may determine the birds to be infected with avian influenza when: (A) first to tenth peak frequencies of the intro peak frequencies form an arithmetic progression, and the first peak frequency which is a fundamental tone corresponds to a first harmonic of a natural frequency of the trachea of the birds, and first to sixth peak frequencies of the outro peak frequencies form an arithmetic progression, and the first peak frequency which is a fundamental tone corresponds to a third harmonic of a natural frequency of the trachea of the birds; or (B) first to third peak frequencies of the intro peak frequencies form an arithmetic progression, and the first peak frequency which is a fundamental tone corresponds to a third harmonic of a natural frequency of the trachea of the birds, and first and second peak frequencies of the outro peak frequencies form an arithmetic progression, and the first peak frequency which is a fundamental tone corresponds to a sixth harmonic of a natural frequency of the trachea of the birds.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
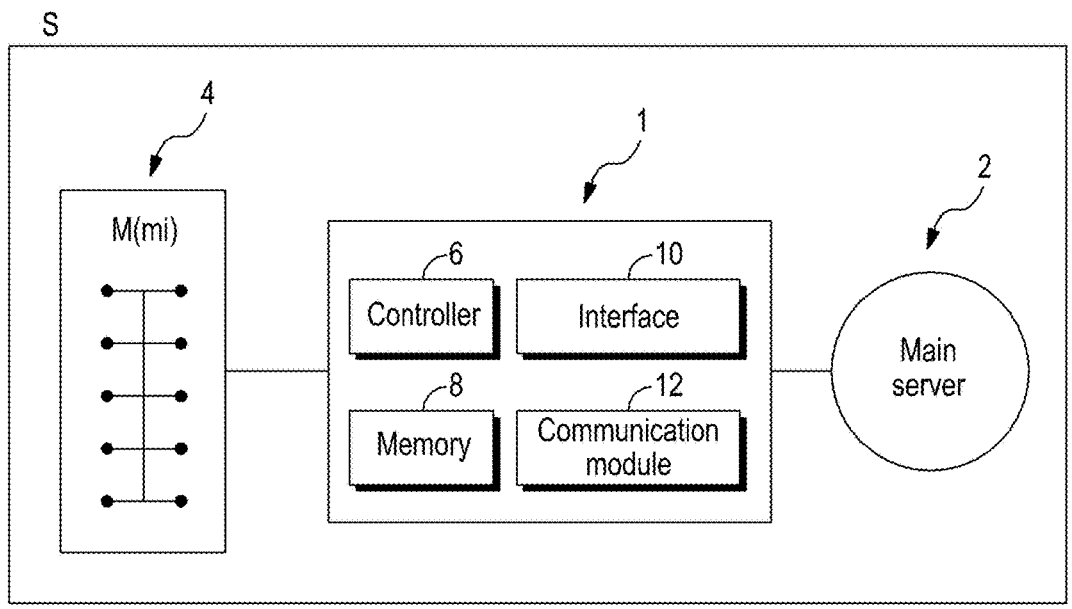
FIG. 1 is a diagram showing the configuration of a system for identifying and diagnosing the sounds of infected wild birds and poultry according to an embodiment of the present invention.

Some embodiments of the present invention will be described in detail below with reference to the accompanying drawings. It should be noted that when reference symbols are assigned to the components of the accompanying drawings, the same reference symbol will be assigned to the same components as much as possible even when the components are shown in different drawings. Furthermore, in the following description of the present invention, if a detailed description of a related well-known configuration or function is determined to make the gist of the present embodiment obscure, the detailed description will be omitted.

The terms "first," "second," etc, "i," "ii," etc., "a," "b," etc, and the like may be used to denote components of embodiments of the present invention. These terms are each used to distinguish one component from other components, but do not denote the essence, sequential position or importance of a corresponding component. Furthermore, when any component is described as "including" or "having" another component in the specification, this does not exclude a third component, but may include the third component, unless clearly described on the contrary.

In an equation, the equal sign "=" refers to not only complete equality in terms of mathematics but also an approximate value or region which can be considered to be equal.

A system for identifying and diagnosing sounds of infected wild birds and poultry according to an embodiment of the present invention includes: a multi channel audio analysis device (MCAAD); and a sound collection unit and a main server connected to the MCAAD via a wired or wireless connection. The MCAAD includes and uses at least one of a high-pass filter, a low-pass filter, and a jet noise filter, emphasizes or reduces a specific frequency band of sound signals of chickens by using an equalizer, and performs the correction and improvement of overall sound quality.

In order to implement an analysis method using approach to a peak frequency in each range according to the sound type of an animal, microphones connected via a wired/wireless connection over the Internet are installed in respective sectors within a fowl run, and a microphone cap cover material capable of preventing impurities, such as dust, the hairs of animals, etc. from being attached in an inhabit for migratory birds or fowl run within a range which does not obstruct the collection of sounds, thereby facilitating washing, mounting, and demounting.

During the sound analysis of the MCAAD, environmental noise is added to effective data, and acts as a factor which obstructs the analysis and identification of normal sounds. A program capable of controlling environmental noise through the analysis of an audio event is installed. The program automatically set such that the program compares the sound of an individual animal with environmental noise, distinguishes them from each other, prevents an error in identification from occurring, recognizes continuously collected data as environmental noise in a state where there is no audio event, analyzes the input and output signals of the noise filter in advance in order to control environmental noise, behavioral noise, etc, and extracts only effective data from animal sounds.

Furthermore, there arises an advantage of comparing, distinguishing, and identifying variations in structure which the fundamental tone of a natural harmonic series and harmonics reaching phoneme-based peak frequencies through an audio event in real time.

In the memory storage unit of the MCAAD, the effective data numerical values of the sounds of individuals infected with animal diseases are converted into big data through deep learning and machine learning, and information about the patterns of the sounds of normal and abnormal animals, the situation reaction sounds of the animals, the physiological sound patterns of the animals, environmental noise, behavioral noise, other noise, etc. are recorded in an artificial intelligence manner.

An embodiment of the present invention will be described in detail below with reference to the accompanying drawings.

FIG. 1 is a diagram showing the configuration of a system S for identifying and diagnosing the sounds of infected wild birds and poultry according to an embodiment of the present invention.

The system S includes: a multi channel audio analysis device (MCAAD) 1; a sound collection unit 4 connected to the MCAAD 1 via a wired or wireless connection; and a main server 2. The sound collection unit 4 may be installed in any place where birds are raised or which is inhabited by birds, such as a fowl run, a habitat for migratory birds, a bird-populated area, or the like. In the place, a plurality of microphones M is installed, collects sounds of birds, and transmits the collected sound information to the MCAAD 1 via a relay.

The MCAAD 1 includes a controller 6, memory 8, an input/output interface 10, and a communication module 12. The MCAAD 1 determines the state of the birds by analyzing the received sound information and extracting effective information, and transmits related information to the main server 2 when the state is determined to be abnormal. The MCAAD 1 may be a computer, PDA, tablet PC, or smartphone on which a corresponding program or application has been installed, but is not limited to a particular device.

When the main server 2 receives information about an outbreak of a disease, the main server 2 notifies an administrator of the information, thereby required measures, such as the provision of a warning to residents near the sound collection unit, preparation for countermeasures against the disease, etc., to be taken. For this purpose, the main server 2 may be connected to a smartphone, a radio, a computer terminal, a tablet PC, and a PDA. However, since a control system or control organization associated with a network or communication means may substitute for the main server 2, the main server 2 can be viewed as being not an essential component of the system S according to the present invention.

Figure 1A:
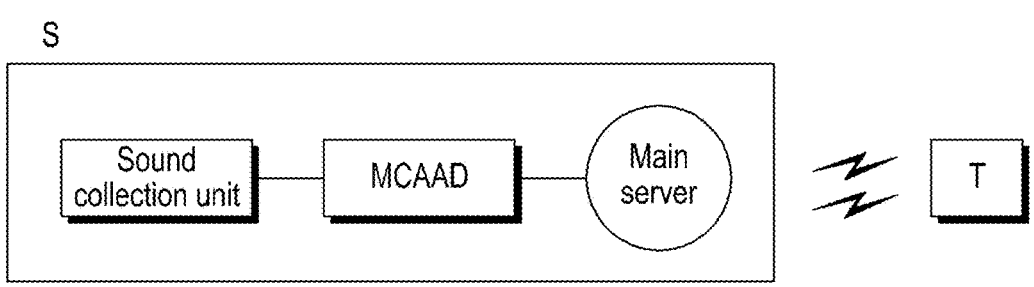
FIG. 1a is a diagram showing the configuration of a system for identifying and diagnosing the sounds of infected wild birds and poultry according to an embodiment of the present invention.

Meanwhile, there are cases where it is difficult for a user who is raising birds and requires information from the main server 2 to directly install and manage expensive equipment in his or her fowl run. In this case, as shown in FIG. 1a, the main server 2 may transmit the information about an outbreak of a disease to a terminal T, such as a smartphone, of the user, thereby preventing the spread of the disease and infection with the disease. It is preferred that a disease management system-related application has been installed on the terminal T in advance and the terminal T can communicate with the main server 2 in real time.

For example, when avian influenza breaks out, avian influenza is highly infectious, and damage is huge when initial countermeasures against the disease fail. Accordingly, the system S according to the present invention can construct an effective disease management system by monitoring whether birds have been infected with avian influenza in real time through the analysis and detection of sounds of the birds.

The system S according to the present invention will be described using chickens as an example of wild birds and poultry. However, the present invention is not limited to specific birds or poultry.

Figure 2:
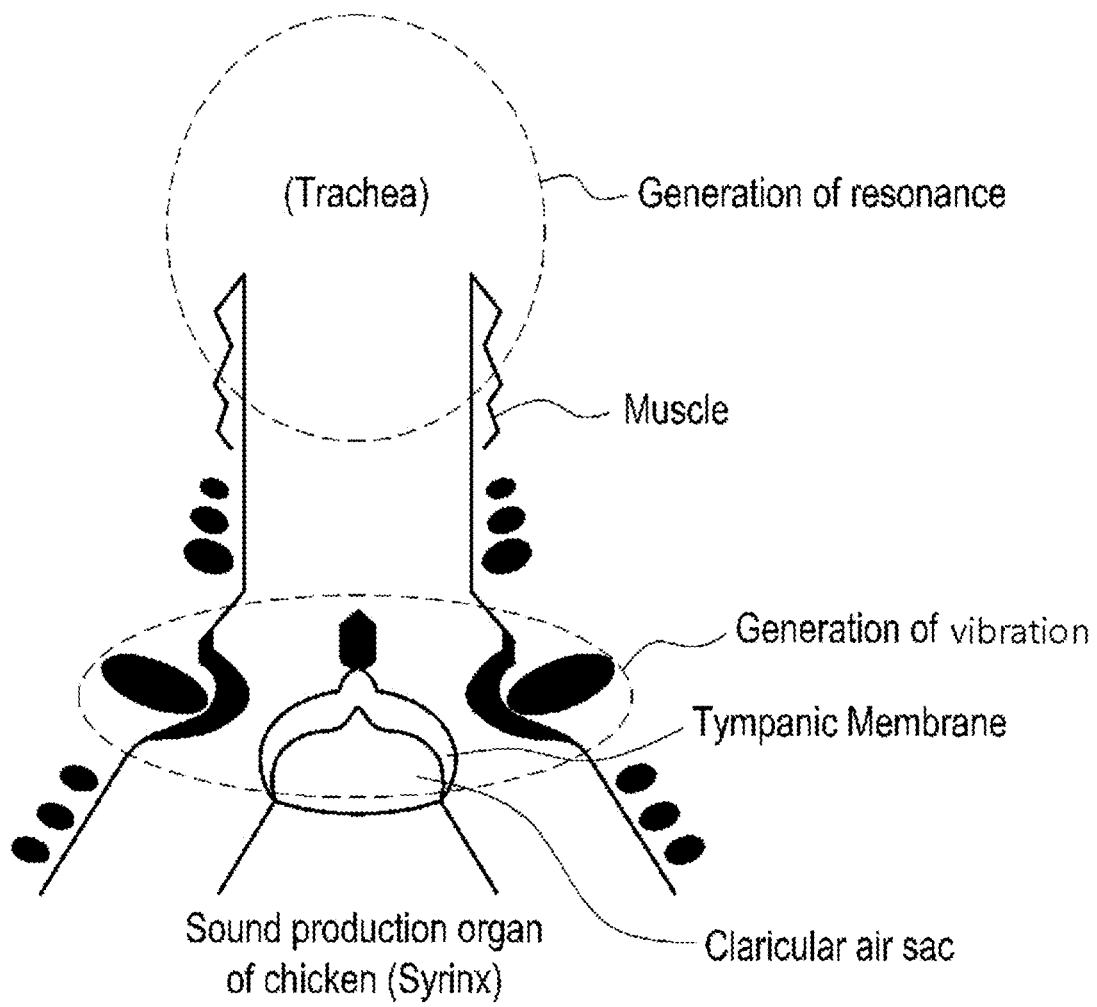
FIG. 2 is a conceptual diagram illustrating the sound production structure of chickens.

As shown in FIG. 2, when the vibrations generated in a vibration generation region are transferred to a trachea, the sounds of a chicken are produced in the case where the frequency of the vibrations generated in the vibration generation region is an integer multiple (an integer multiple or natural harmonic series) of the natural frequency of the trachea. This is similar to the principle by which when a player plays a trumpet, sounds are produced in the case where a frequency generated through the trembling of lips of the player is an integer multiple of the natural frequency of a trumpet tube. Furthermore, in the sound production process of a chicken, the frequency can be varied by adjusting the length of the trachea by means of the pressure of an air sac and muscles near the trachea.

It is known that although chickens have different natural frequencies depending on their gender (a rooster, or a hen) and the length and thickness of tracheas, the natural frequencies of the chickens range from 130 to 195 Hz. Although the natural frequencies thereof are different, the principle in which the sounds of chickens are produced at a natural harmonic series does not vary. Therefore, it may be required for the determination of the state of chickens to extract natural harmonics each corresponding to an integer multiple of the natural frequency as effective frequencies and analyze the effective frequencies.

Figure 3:
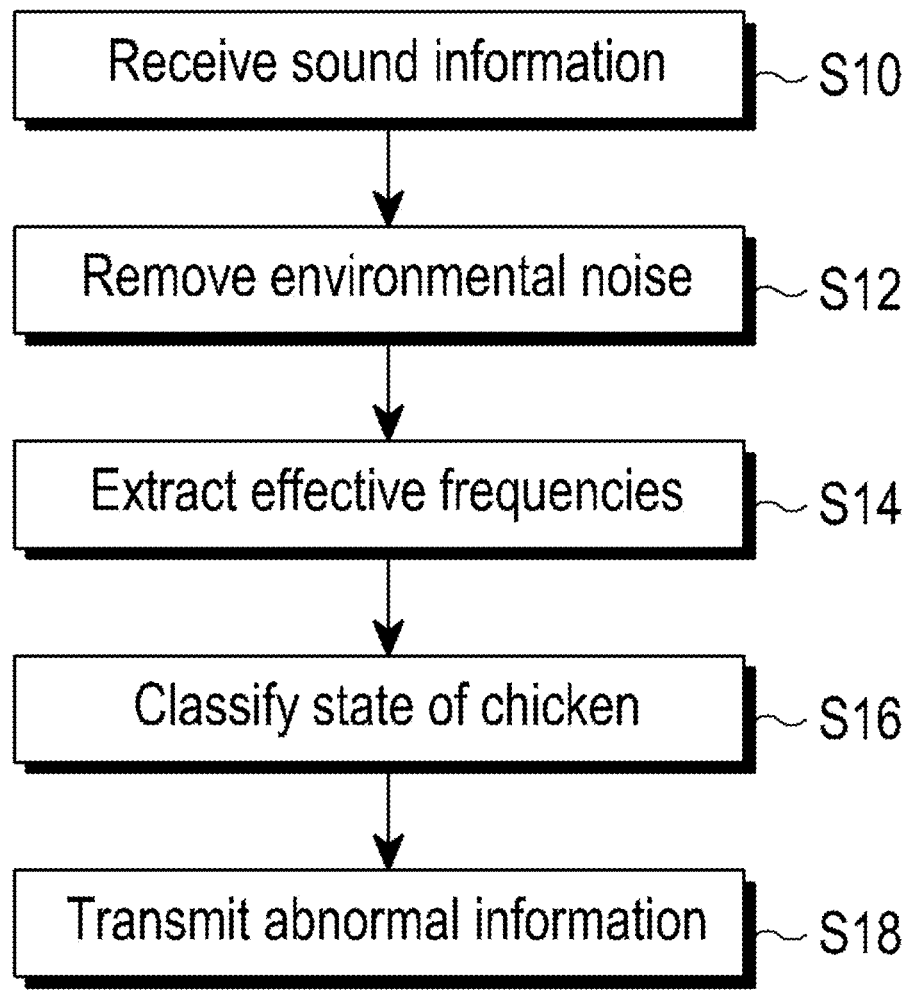
FIG. 3 is a flowchart illustrating the operation of an MCAAD according to an embodiment of the present invention.

FIG. 3 is a flowchart illustrating the operation of the MCAAD 1 according to an embodiment of the present invention.

The MCAAD 1 receives information about the sounds of chickens at step S10. Environmental noise is filtered out at step S12, and effective frequencies are extracted at step S14. The current state of the chickens are determined and classified by analyzing the effective frequencies at step S16. When the state is classified as an abnormal state, corresponding information is transmitted to the main server at step S18.

The MCAAD 1 uses a fast Fourier transform (FFT) as a sound analysis technique. An FFT is a tool which is useful to analyze a fundamental frequency and higher harmonics. The MCAAD 1 uses a peak frequency detect (PFD) technique for the purpose of extracting effective frequencies.

The components of a frequency are identified by converting collected audios into FFT spectra in order to extract effective data for the sound analysis of the chickens. In this case, when peak frequencies which exceed environmental noise and are equal to or higher than a predetermined decibel form an arithmetic progression or when generated peak frequencies are the same as data previously stored in the memory 8 of the MCAAD 1, they are classified as effective data. When effective peak frequencies form an arithmetic progression and a fundamental tone, i.e., the lowest frequency of the effective peak frequencies, corresponds to previously stored data or when the adjacent peak frequencies of effective peak frequencies form an arithmetic progression and correspond to previously stored data, collected sounds are determined to be sounds of chickens.

1. Environmental Noise Filtering

Since environmental noise may be present around the sound collection unit 4, it is necessary to filter out periodic or irregular noise for the purpose of sound identification and normal analysis.

Figure 4:
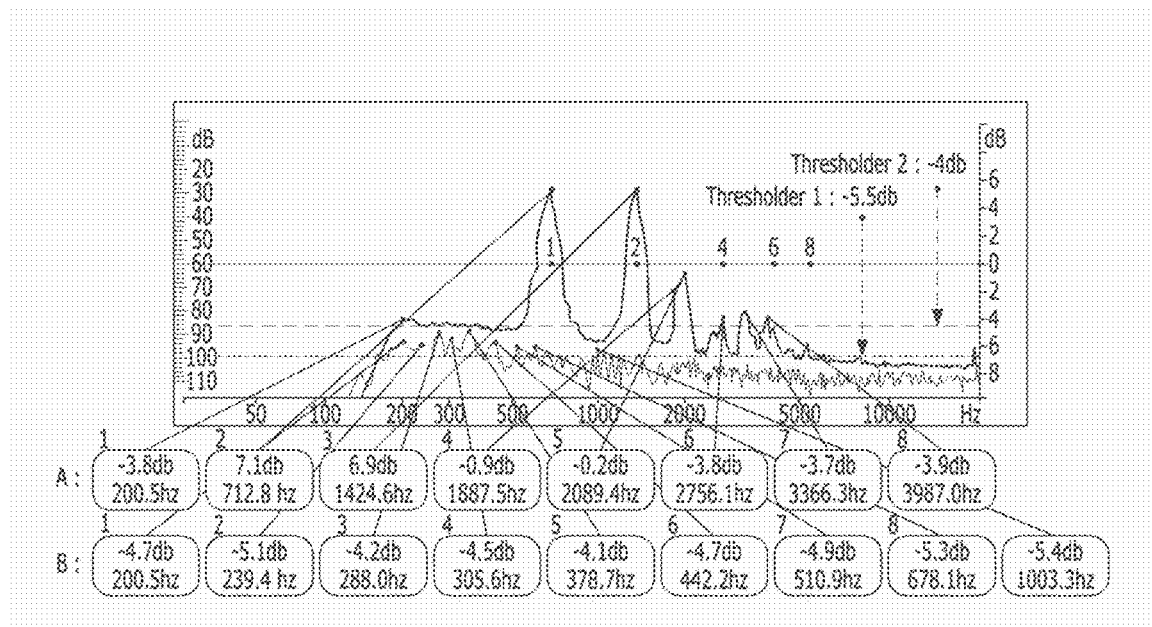
FIG. 4 is a graph showing the results of the analysis of the sounds of chickens and noise by using an FFT in the MCAAD.
Figure 5A:
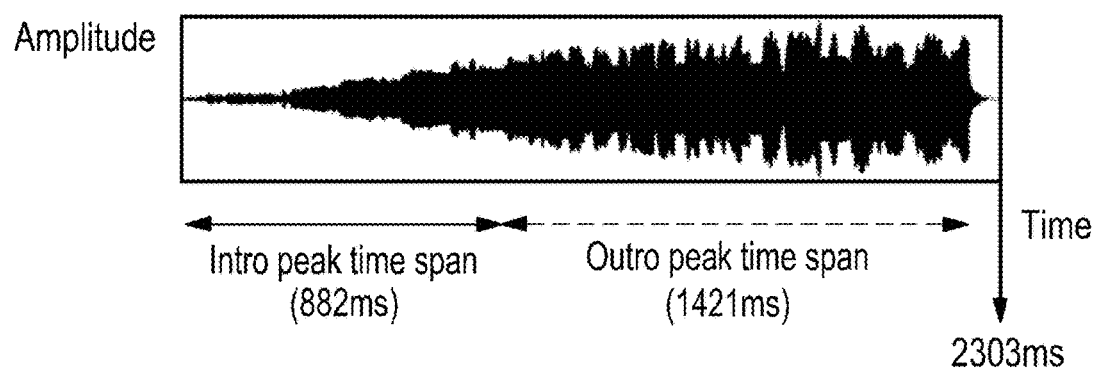
FIG. 5a show the relationships between an intro peak frequency time and an outro peak frequency time span, and amplitudes.
Figure 5B:
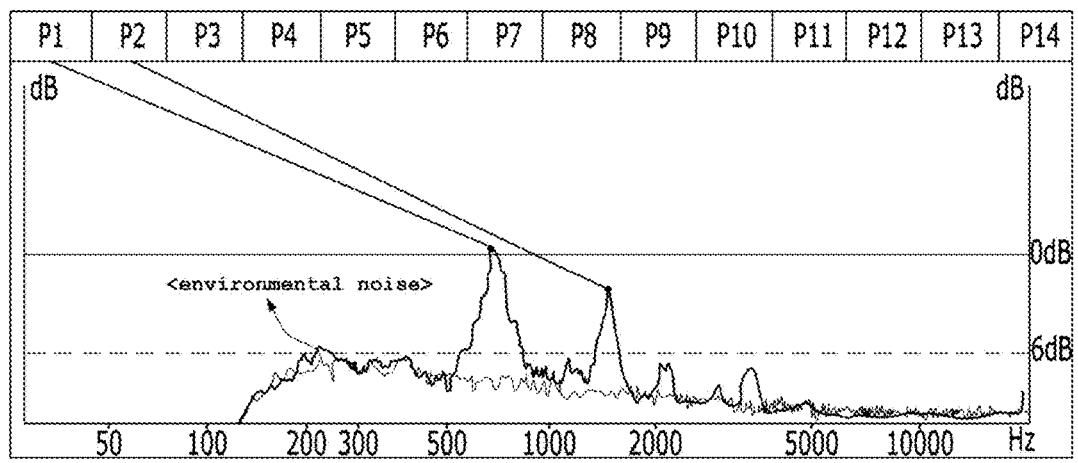
FIG. 5b is a graph showing intro peak frequencies which were measured when an environmental noise threshold value was set to 6 db.
Figure 5C:
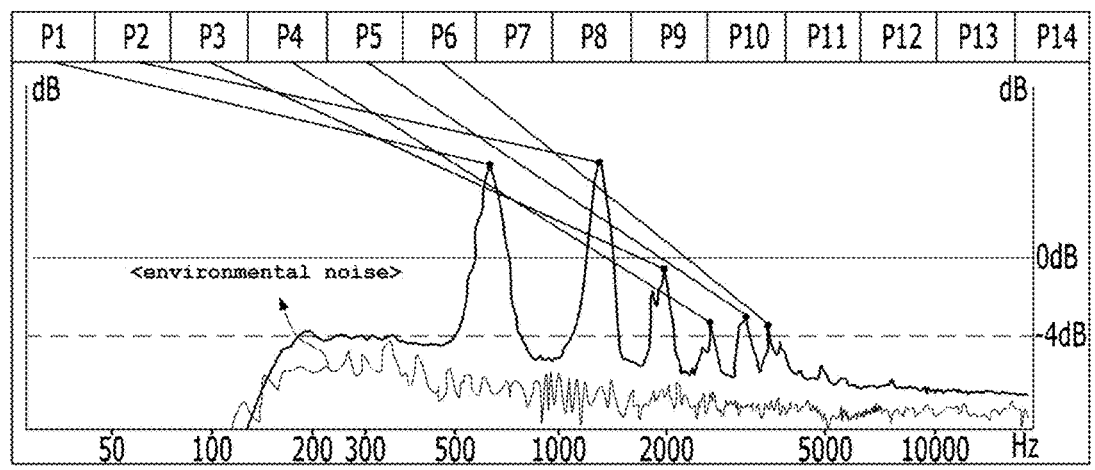
FIG. 5c is a graph showing outro peak frequencies which were measured when an environmental noise threshold value was set to 4 db.
Figure 6A:
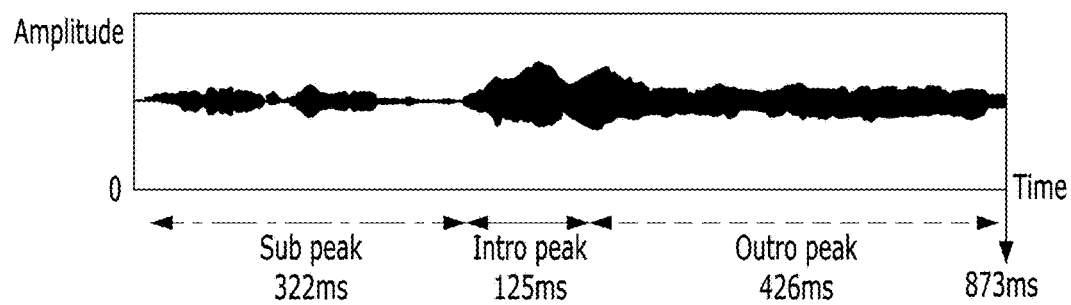
FIG. 6a shows the relationships between a sub peak frequency time span, an intro peak frequency time span and an outro peak frequency time span, and amplitudes when a rooster goes "cock-a-doodle-doo.
Figure 6B:
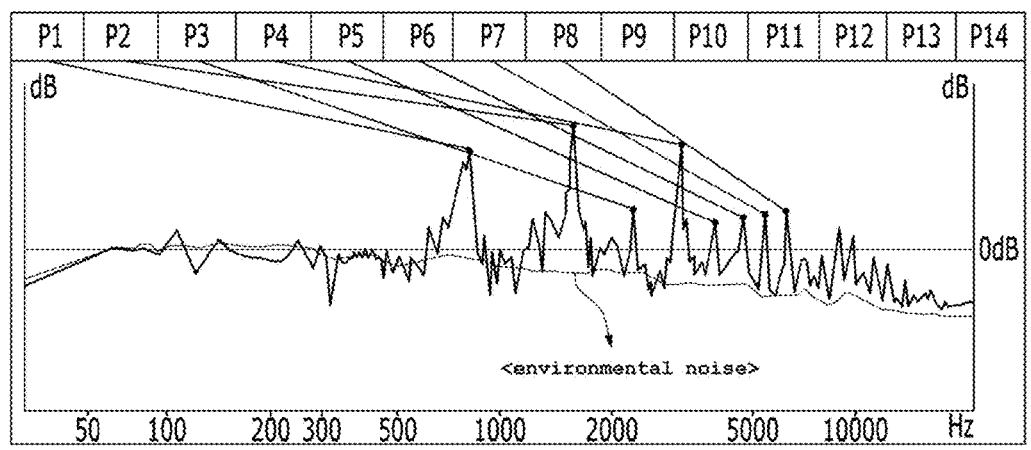
" FIG. 6b is a graph showing measured intro peak frequencies.
Figure 6C:
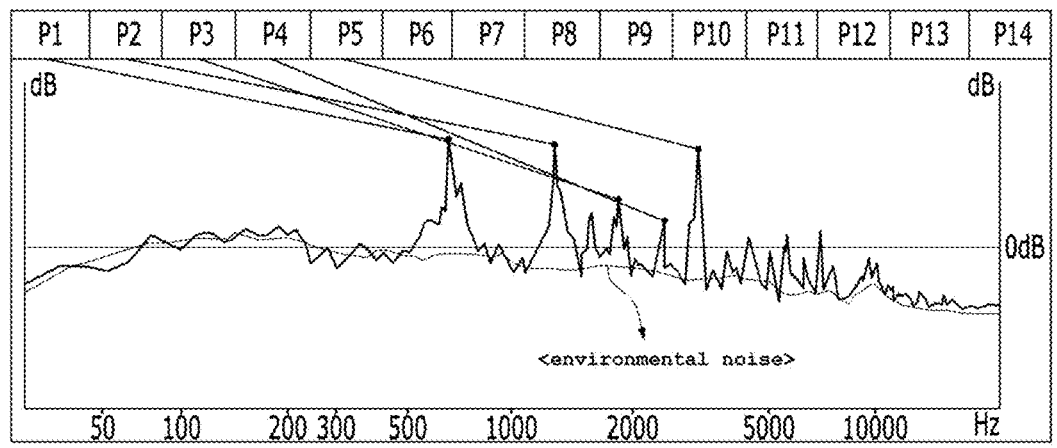
FIG. 6c is a graph showing measured outro peak frequencies.

FIG. 4 is a graph showing the results of the analysis of the sounds of chickens and noise by using an FFT in the MCAAD 1. The lateral axis of the graph represents frequencies Hz, and the vertical axis thereof represents decibels db. The sounds of the chickens are indicated by solid lines, and noise is indicated by thin lines.

The sounds of the chickens are widely distributed in the range from 120 to 10 kHz. In particular, peak frequencies are concentrated in the range from 200 to 5 kHz. The sound levels thereof are distributed in the range from 7 to 6 db. A plurality of peak frequencies (in this case, seven peak frequencies) which have possibility of being used in sound analysis, are selected, and sound levels and frequencies are measured at individual points. The results thereof are listed below.

In the following, a frequency at each point is denoted additionally using the lowercase letter "f."

TABLE 1

| A1 | A2 | A3 | A4 | A5 | A6 | A7 | A8 |
|---|---|---|---|---|---|---|---|
| −3.8 db | 7.1 db | 6.9 db | −0.9 db | −0.2 db | −3.8 db | −3.7 db | −3.9 db |
| 200.5 Hz | 712.8 Hz | 1424.6 Hz | 1887.5 Hz | 2089.4 Hz | 2756.1 Hz | 3366.3 Hz | 3987.0 Hz |

In this case, it can be seen that the frequencies at points A2, A3, A5, A6, A7 and A8 is approximate to an arithmetic progression with a common difference of the frequency at point A2. In other words, A2f, A3f, A5f, A6f, A1f, and A8f form an arithmetic progression with a common difference of A2f.

The frequencies at points A1 and A4 are considered to be ineffective information which is generated by being recognized as changes in pitch during an overlapping process, and are thus excluded from analysis. A2f corresponds to about the fourth multiple of the natural frequency T of the trachea of chickens. When point A2 having the first term of a progression, such as A2f, is expressed using a "fundamental tone,"

$$A2f=4T, A3f=2 \times A2f=8T, \ldots, A8f=7 \times A2f=28T$$

where the equal sign "=" is used as a concept which refers to not only complete equality in terms of mathematics but also an approximate value or region which can be considered to be equal. Since the present invention is based on the quantitative analysis of frequencies, the above usage of the equal sign can be viewed as appropriate.

From the foregoing, it can be seen that based on the natural frequency of a trachea, a fundamental tone, which is an integer multiple of the natural frequency, and harmonics, which have frequencies, i.e., integer multiples of the fundamental tone, and which form an arithmetic progression, are present. This forms a basic principle by which effective phonemes and effective frequencies are extracted.

Although noise is widely distributed over all frequency bands, it does not exhibit a concentrated peak frequency region, like the sounds of the chickens. It is thought that the noise was measured in a static environment. Sound levels were measured at nine points at which the peak frequencies of the noise were generated, as follows:

TABLE 2

| B1 | B2 | B3 | B4 | B5 | B6 | B7 | B8 | B9 |
|---|---|---|---|---|---|---|---|---|
| −4.7 db | −5.1 db | −4.2 db | −4.5 db | −4.1 db | −4.7 db | −4.9 db | −5.3 db | −5.4 db |
| 200.5 Hz | 239.4 Hz | 288.0 Hz | 305.6 Hz | 378.7 Hz | 442.2 Hz | 510.9 Hz | 678.1 Hz | 1003.3 Hz |

It can be seen that noise it is appropriate to set a filtering threshold value to, for example, about 4.0 db in order to clearly identify the sounds of the chickens and eliminate noise. The reason for this is that above the threshold value, frequency spectra including eight peak frequencies belonging to the sounds of the chickens can be analyzed and all noise peak values can be eliminated. However, for example, when the noise filtering threshold value is 7.0 db, the peak frequency point moves from a low frequency to a high frequency, A1, B1, B2, . . . , B8, A2, B9, A3, . . . , A8. This is not appropriate because sounds of the chickens are mixed with noise, it is difficult to identify peak frequencies, and it is difficult to obtain correlations between peak frequencies.

The foregoing illustrates an example of the environmental noise filtering. An appropriate threshold value needs to be set by considering the fact that environmental noise is variable depending on a measurement location and time.

2. Chicken Sound Analysis

In the case of normal chickens, the first harmonic of the natural frequency of their trachea is rarely measured, and sounds ranging from the second harmonic to the sixth harmonic are produced according to their type. In every chicken sound, an intro peak is generated during a sound production process. This corresponds to a process of approaching a threshold value from which vibrations are generated, as in the sound production of humans. Furthermore, when the threshold value is reached, an outro peak is determined. A normal chicken stably reaches the threshold value within a considerably short period of time, and a natural harmonic appears clearly.

An individual chicken infected with a respiratory disease virus produces thick sounds. According to the anatomical characteristics of the organs of a chicken, exudates generated due to the respiratory disease virus easily interfere with sound production. Even when vibrations generated by the tympanic membrane of the syrinx reach the threshold value at which the trachea can be made to resonate, sound production conditions need to be met and maintained. However, when interference occurs due to exudates, vibrations are not generated at a harmonic series where a trachea resonates, but repetitive shift to an adjacent region may occur. Alternatively, the vibration energy leaving the harmonic series where a trachea resonates forcibly vibrates the trachea, thereby generating thick sounds.

When audio data collected on a per-syllable or phoneme basis is converted using an FFT, frequency components can be found. In this case, when data exceeds environmental noise and forms an arithmetic progression along with peak frequencies equal to or higher than a predetermined decibel or peak frequencies are the same as previously stored data, the corresponding data is classified as effective data.

A chicken sound analysis method using peak frequencies uses the phenomena in which intro peak frequencies (sound production starting frequencies) and outro peak frequencies (sound production ending frequencies) extracted based on generation time within a single syllable or phoneme are generated while resonating at a specific harmonic of a natural harmonic series where the trachea of chickens resonates or intro peaks and outro peaks resonate different harmonics of the natural harmonic series where the trachea of chickens resonates according to sound type. This sound type may be basically classified into five types, as follows:

During a process of approaching a threshold value for sound production within a single phoneme, a time interval occurs between extracted intro peak frequencies and outro peak frequencies.

Of the sound types of chickens, there is a sound type in which a shift from a specific harmonic series where the trachea resonates to another harmonic series at a time interval. A representative example thereof is the crying sound "cock-a-doodle-doo" of a rooster which is produced within a single syllable.

When a change in the state of the trachea is made within a single phoneme, this influences extracted effective frequencies, and thus a phenomenon in which all peak frequencies forming an arithmetic progression are shifted occurs.

When the interference of exudates within the trachea attributable to a respiratory disease occurs during a process of approaching a threshold value for sound production within a single phoneme, intro peak frequencies do not stably resonate at a single harmonic, and a shift to an adjacent resonant harmonic series may be made at outro peak frequencies or an overall resonant harmonic series may resonate unstably.

There occurs a phenomenon in which peak frequencies forming an arithmetic progression within a single phoneme shift from a specific natural harmonic series where the trachea resonates to a higher-order harmonic series over time. A representative example thereof is the sound type of highly pathogenic avian influenza in which pain (screams) and mental degradation occur.

In the following, an example of extracting effective frequencies and determining the state of a chicken by using the MCAAD 1 will be described. The following graphs show the results of collecting crying sounds of chickens in different states and analyzing the sounds by using an FFT in various environments.

(A) Case where Chickens are in a Serene State

In order to measure the sounds of normal chickens, during a period from Feb. 10, 2017 to Aug. 10, 2017, behavioral noise, environmental noise, reaction sounds between chickens attributable to the occurrence of a situation, and other noise were analyzed through image recording and sound recording, and the types of sounds of the normal chickens were classified based on the results of the analysis. Experiments were conducted on a total of 50 chickens (breed: Brown Leghorn) in an open-air farm during six months. Based on growth per date, in the overall range from chicks to adult chickens, sounds were classified according to gender, the sounds of normal individual chickens were classified, and differences were classified according to sound types.

FIG. 5*a* derived from the results of the experiments show the relationships between an intro peak frequency time span from 0 to 882 ms and an outro peak frequency time span from 883 to 2303 ms, and amplitudes. These are feigned sounds which were produced by hens in a serene state. The fundamental tone thereof corresponds to a fourth harmonic where a trachea resonates, and a distinctive harmonic was generated. A sound event continues for a relatively long period of time. In the case of a normal chicken, sounds were low, and the natural frequency of the trachea was decreased in a direction from an intro peak to an outro peak.

FIG. 5*b* is a graph showing intro peak frequencies which were measured when an environmental noise threshold value was set to 6 db, and FIG. 5*c* is a graph showing outro peak frequencies which were measured when an environmental noise threshold value was set to 4 db.

When a plurality of primary peak frequencies, i.e., two intro peak frequencies and six outro peak frequencies, having the possibility of being used for sound analysis were selected from the graphs and sound levels and frequencies were measured at individual points, the following results were obtained:

TABLE 3

| | P1 | P2 | P3 | P4 | P5 | P6 |
|---|---|---|---|---|---|---|
| Intro F. | −0.2 db<br>730.5 Hz | −1.9 db<br>1461.2 Hz | — | — | — | — |
| Outro F. | 7.1 db<br>712.8 Hz | 6.9 db<br>1424.6 Hz | −0.2 db<br>2089.4 Hz | −3.8 db<br>2756.1 Hz | −3.7 db<br>3366.3 Hz | −3.9 db<br>3987.0 Hz |

Of the intro peak frequencies, the first peak frequency P1fi and the second peak frequency P2fi form an arithmetic progression, and the first peak frequency P1fi is a fundamental tone. The fundamental tone corresponds to a fourth harmonic when it is assumed that the natural frequency of a trachea is 182.6 Hz.

Of the outro peak frequencies, the first peak frequency P1fo to the sixth peak frequency P6fo form an arithmetic progression, and the first peak frequency P1fo is a fundamental tone. The fundamental tone corresponds to a fourth harmonic when it is assumed that the natural frequency of a trachea is 178 Hz.

When the fundamental tone of the intro peak frequencies and the fundamental tone of the outro peak frequencies were compared with individual harmonics based on the natural frequency of the trachea over a range from 0 to 2303 ms, the following results were obtained:

TABLE 4

| | Order | | | | | | | |
|---|---|---|---|---|---|---|---|---|
| | 1 | 2 | 3 | 4 | 5 | 6 | 7 | 8 |
| Frequency (Hz) | 182.6 | 365.2 | 547.8 | 730.4 | 913 | 1095.6 | 1278.2 | 1460.8 |

<natural frequency: 182.6 Hz>

TABLE 5

| | Order | | | | | | | |
|---|---|---|---|---|---|---|---|---|
| | 1 | 2 | 3 | 4 | 5 | 6 | 7 | 8 |
| Frequency (Hz) | 178 | 356 | 534 | 712 | 890 | 1068 | 1424 | 1602 |

<natural frequency: 178 Hz>

It can be seen that the fundamental tone of the intro peak frequencies and the fundamental tone of the outro peak frequencies correspond to the fourth harmonic of the natural frequency and there is no shift.

(B) Case where the Sounds of Chickens are Loud

FIG. 6*a* shows the relationships between a sub peak frequency time span from 0 to 322 ms, an intro peak frequency time span from 323 to 448 ms and an outro peak frequency time span from 449 to 873 ms, and amplitudes in experimental conditions identical to those of (A) when a rooster goes "cock-a-doodle-doo."

The sub peak frequency time span corresponds to "cock-a" and exhibits the same peak frequencies as the outro peak frequency time span corresponding to "doo," a description thereof is omitted. The intro peak frequency time span corresponds to "doodle," exhibits a major 3rd interval difference with respect to "cock-a" and "doo," and corresponds to the fourth and fifth harmonics of a harmonic series where the trachea resonates. While a chicken was going "cock-a-doodle-doo," the natural frequency was not influenced without a change to the trachea. After an outro peak frequency, the natural frequency of the trachea was decreased, and a sound event was terminated.

FIG. 6*b* is a graph showing intro peak frequencies which were measured when an environmental noise threshold value was set to 0.8 db, and FIG. 6*c* is a graph showing outro peak frequencies which were measured when an environmental noise threshold value was set to 0.8 db.

When a plurality of primary peak frequencies, i.e., eight intro peak frequencies and five outro peak frequencies, having the possibility of being used for sound analysis were selected from the graphs and sound levels and frequencies were measured at individual points, the following results were obtained:

TABLE 6

|  | P1 | P2 | P3 | P4 | P5 | P6 | P7 | P8 |
|---|---|---|---|---|---|---|---|---|
| Intro F. | 4.2 db | 5.9 db | 1.8 db | 4.3 db | 1.1 db | 1.2 db | 1.4 db | 1.4 db |
|  | 793.8 Hz | 1587.6 Hz | 2381.8 Hz | 3175.5 Hz | 3967.0 Hz | 4762.2 Hz | 5556.6 Hz | 6350.4 Hz |
| Outro F. | 5.4 db | 5.2 db | 2.5 db | 1.0 db | 5.0 db | — | — | — |
|  | 635.4 Hz | 1270.8 Hz | 1906.0 Hz | 2541.9 Hz | 3177.8 Hz |  |  |  |

Of the intro peak frequencies, the first peak frequency P1fi to the eighth peak frequency P8fi form an arithmetic progression, and the first peak frequency P1fi is a fundamental tone. The fundamental tone corresponds to a fifth harmonic when it is assumed that the natural frequency of a trachea is 158.8 Hz.

Of the outro peak frequencies, the first peak frequency P1fo to the fifth peak frequency P5fo form an arithmetic progression, and the first peak frequency P1fo is a fundamental tone. The fundamental tone corresponds to a fourth harmonic when it is assumed that the natural frequency of a trachea is 158.8 Hz.

When the fundamental tone of the intro peak frequencies and the fundamental tone of the outro peak frequencies were compared with individual harmonics based on the natural frequency of the trachea over a range from 0 to 873 ms, the following results were obtained:

TABLE 7

| | Order | | | | | | | |
|---|---|---|---|---|---|---|---|---|
| | 1 | 2 | 3 | 4 | 5 | 6 | 7 | 8 |
| Frequency (Hz) | 158.8 | 317.6 | 476.4 | 635.2 | 794 | 952.8 | 1111.6 | 1270.4 |

<natural frequency: 158.8 Hz>

It can be seen that the fundamental tone of the intro peak frequencies has been moved from the fifth harmonic to the fourth harmonic, which is the fundamental tone of the outro peak frequencies.

(C) Case where Chickens have been Infected with a Respiratory Disease Virus—a Respiratory Disease Alarm State When a chicken has been infected with a respiratory disease virus, such as an infectious bronchitis (IB) virus, a Newcastle disease (ND) virus, or an infectious laryngotracheitis (ILT) virus, it is common that thick sound and exudates are generated. Experiments on the sound analysis of chickens infected with the individual respiratory disease viruses were conducted, as follows:

In order to measure the sounds of chickens infected with IB, experiments were conducted on a total of ten chickens (chicken breed: Brown leg horn) in an open-air farm during a period of six days from Jul. 1, 2017. The sounds of normal chickens and chickens infected with IB were analyzed a per individual basis with distinctive scores assigned to individual chickens according to clinical signs per date. After the chickens had been vaccinated with an IB vaccine in the afternoon on Jul. 1, 2017, ten chickens exhibiting no infection signs during a period from a first day to a third day were classified as normal, and seven to nine chickens exhibiting IB-related clinical signs (coughs, respiratory sounds, etc.) from a fourth day, i.e., Jul. 4, 2017, were classified as infected.

Furthermore, in order to measure the sounds of chickens infected with ND, experiments were conducted on a total of ten chickens (chicken breed: Brown leg horn) in an open-air farm during a period of six days from Jul. 10, 2017. The sounds of normal chickens and chickens infected with ND were analyzed a per individual basis with distinctive scores assigned to individual chickens according to clinical signs per date. After the chickens had been vaccinated with an ND vaccine in the afternoon on Jul. 10, 2017, ten chickens exhibiting no infection signs during a period from a first day to a third day were classified as normal, and seven to nine chickens exhibiting ND-related clinical signs from the morning on Jul. 14, 2017 were classified as infected.

Moreover, in order to measure the sounds of chickens infected with ILT, experiments were conducted on a total of ten specific-pathogen-free chickens (chicken breed: White leg horn) in a separate animal farm within a veterinary college during a period of six days from Jun. 1, 2017.

The sounds of normal chickens and chickens infected with ILT were analyzed a per individual basis with distinctive scores assigned to individual chickens according to clinical signs per date. After the chickens had been vaccinated with an ILT vaccine in the afternoon on Jun. 1, 2017, ten chickens exhibiting no infection signs during a period from a first day to a third day were classified as normal, and seven to nine chickens exhibiting ILT-related clinical signs from the morning on Jun. 4, 2017 were classified as infected.

It was common that the sound of the chickens infected with the above three respiratory diseases was thick sound and exudates were found in the chickens. Additionally, the case of difficulty in breathing exhibited another pattern.

① Case where Thick Sound was Generated (Exudates and Difficulty in Breathing)

Figure 7A:
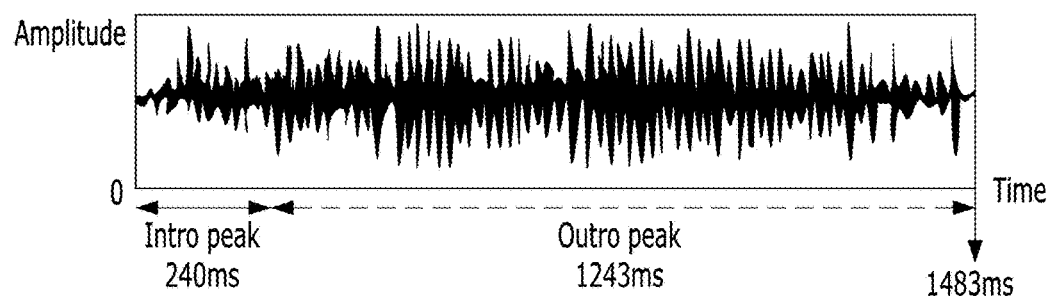
FIG. 7a is a graph showing the relationships between an intro peak frequency time span and an outro peak frequency time span, and amplitudes for hens infected with respiratory diseases.
Figure 7B:
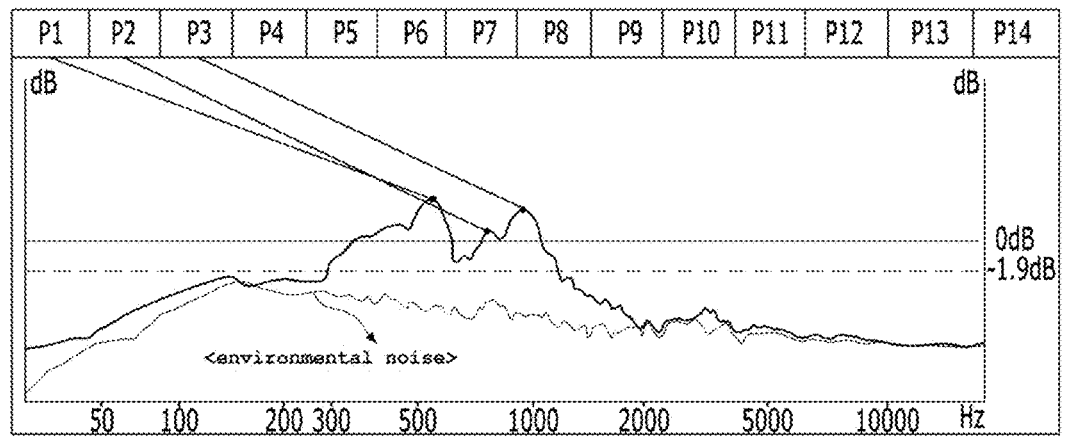
FIG. 7b is a graph showing measured intro peak frequencies.
Figure 7C:
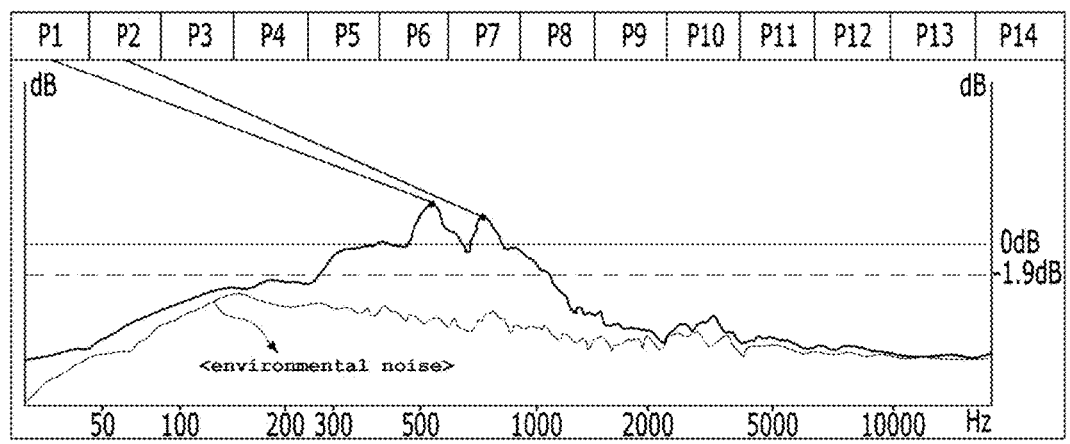
FIG. 7c is a graph showing measured outro peak frequencies.

FIG. 7a derived from the results of the experiments shows the relationships between an intro peak frequency time span from 0 to 240 ms and an outro peak frequency time span from 241 to 1483 ms, and amplitudes for hens infected with the respiratory diseases. FIG. 7b is a graph showing intro peak frequencies which were measured when an environmental noise threshold value was set to 1.9 db, and FIG. 7c is a graph showing measured outro peak frequencies.

When a plurality of primary peak frequencies, i.e., three intro peak frequencies and two outro peak frequencies, having the possibility of being used for sound analysis were selected from the graphs and sound levels and frequencies were measured at individual points, the following results were obtained:

TABLE 8

|  | P1 | P2 | P3 |
|---|---|---|---|
| Intro F. | 2.3 db | 0.6 db | 1.7 db |
|  | 582.0 Hz | 776.6 Hz | 971.8 Hz |
| Outro F. | 2.7 db | 5.2 db | — |
|  | 582.0 Hz | 775.4 Hz |  |

Of the intro peak frequencies, the first peak frequency P1fi to the third peak frequency P3fi form an arithmetic progression, and the first peak frequency P1fi is a fundamental tone. The fundamental tone corresponds to a third harmonic when it is assumed that the natural frequency of a trachea is 194.2 Hz. Points P1, P2 and P3 successively form a third harmonic, a fourth harmonic, and a fifth harmonic.

Of the outro peak frequencies, the first peak frequency P1fo and the second peak frequency P2fo form an arithmetic progression, and the first peak frequency P1fo is a fundamental tone. The fundamental tone corresponds to the third harmonic when it is assumed that the natural frequency of a trachea is 194.2 Hz. Points P1 and P2 successively form a third harmonic, and a fourth harmonic.

As described above, feigned sounds are produced at the fourth harmonic of the natural frequency of the trachea in the case of normal chickens. However, when exudates are generated within the trachea and difficulty in breathing occurs, the threshold value of the fourth harmonic is not met, resonance is generated at a lower harmonic series, and repetitive shift to an adjacent region occurs.

When the fundamental tone of the intro peak frequencies and the fundamental tone of the outro peak frequencies were compared with individual harmonics based on the natural frequency of the trachea over a range from 0 to 1483 ms, the following results were obtained:

TABLE 9

| | Order | | | | | | | |
|---|---|---|---|---|---|---|---|---|
| | 1 | 2 | 3 | 4 | 5 | 6 | 7 | 8 |
| Frequency (Hz) | 194.2 | 388.4 | 582.6 | 776.8 | 971 | 1165.2 | 1359.4 | 1553.6 |

<natural frequency: 194.2 Hz>

It can be seen that the fundamental tone of the intro peak frequencies and the fundamental tone of the outro peak frequencies correspond to a third harmonic natural frequency and there is no variation.

② Case where Thick Sounds are Generated (a Forced Vibration Phenomenon Attributable to Exudates)

Figure 8A:
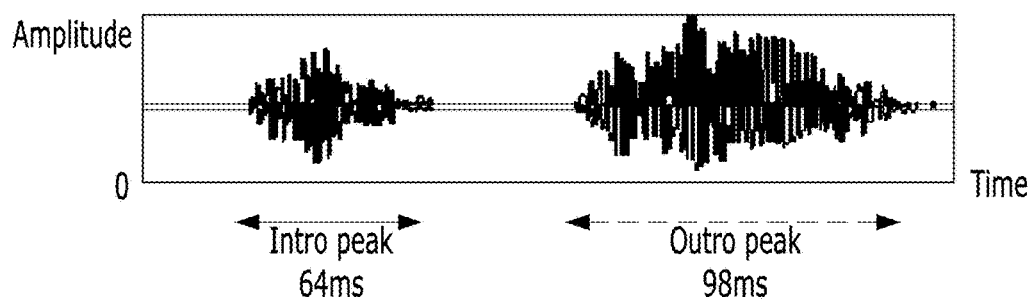
FIG. 8a is a graph showing the relationships between an intro peak frequency time span and an outro peak frequency time span, and amplitudes when a rooster infected with a respiratory disease goes an unstable and boundary type of sound.
Figure 8B:
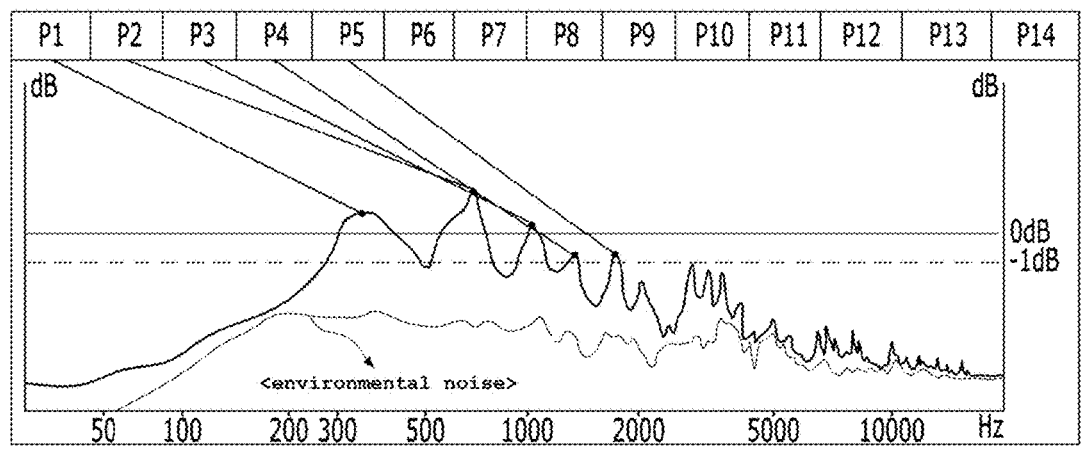
FIG. 8b is a graph showing measured intro peak frequencies.
Figure 8C:
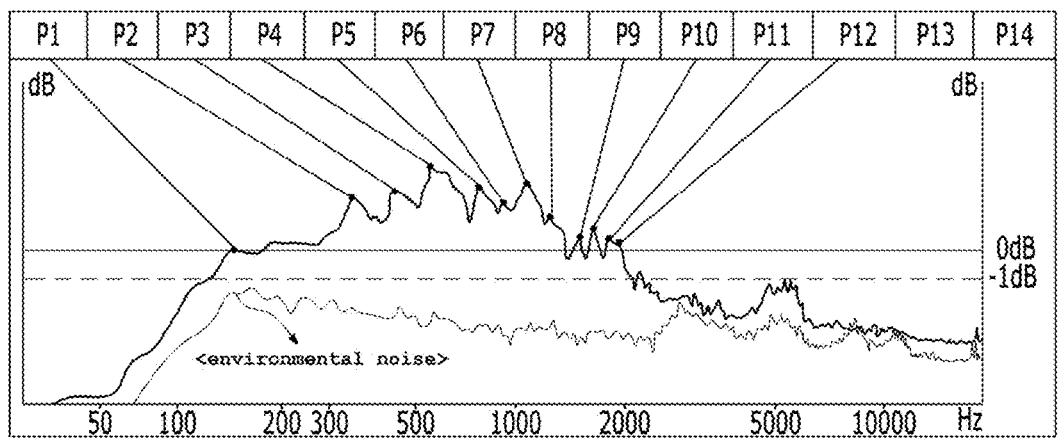
FIG. 8c is a graph showing measured outro peak frequencies.

FIG. 8a derived from the results of the experiments show the relationships between an intro peak frequency time span (a span of 64 ms) and an outro peak frequency time span (a span of 98 ms), and amplitudes when a rooster infected with a respiratory disease goes an unstable and boundary type of sound. FIG. 8b is a graph showing intro peak frequencies which were measured when an environmental noise threshold value was set to 1.0 db, and FIG. 8c is a graph showing measured outro peak frequencies.

When a plurality of primary peak frequencies, i.e., five intro peak frequencies and 12 outro peak frequencies, having the possibility of being used for sound analysis were selected from the graphs and sound levels and frequencies were measured at individual points, the following results were obtained:

TABLE 10

| | P1 | P2 | P3 | P4 | P5 |
|---|---|---|---|---|---|
| Intro F. | 1.4 db | 2.2 db | 0.9 db | −0.8 db | −0.9 db |
| | 344.5 Hz | 689.2 Hz | 1033.8 Hz | 1378.0 Hz | 1724.3 Hz |

TABLE 11

| | P1 | P2 | P3 | P4 | P5 | P6 |
|---|---|---|---|---|---|---|
| Outro F. | −0.1 db | 3.2 db | 3.5 db | 5.2 db | 3.5 db | 3.0 db |
| | 159.4 Hz | 318.0 Hz | 478.5 Hz | 637.5 Hz | 797.1 Hz | 956.2 Hz |
| Outro F. | P7 | P8 | P9 | P10 | P11 | P12 |
| Outro F. | 4.1 db | 2.3 db | 0.3 db | 1.2 db | 0.3 db | 0.3 db |
| | 1115.5 Hz | 1275.7 Hz | 1434.8 Hz | 1594.1 Hz | 1755.3 Hz | 1910.6 Hz |

Of the intro peak frequencies, the first peak frequency P1fi to the fifth peak frequency P5fi form an arithmetic progression, and the first peak frequency P1fi is a fundamental tone. The fundamental tone corresponds to the second harmonic when the natural frequency of a trachea is 172.2 Hz.

Of the outro peak frequencies, the first peak frequency P1fo to the twelfth peak frequency P12fo form an arithmetic progression, and the first peak frequency P1fo is a fundamental tone. The fundamental tone corresponds to a first harmonic when the natural frequency of the trachea is 159.4 Hz.

At the intro peak frequencies, peaks occurred at the second harmonic of the natural frequency of the trachea. In contrast, at the outro peak frequencies, the threshold value of a third harmonic where the trachea resonates was not met due to the interference of exudates within the trachea, the trachea resonates forcibly, and resonance was generated at the natural frequency. This is one of the conditions under which thick sounds are recognized.

When the fundamental tone of the intro peak frequencies and the fundamental tone of the outro peak frequencies were compared with individual harmonics based on the natural frequency of the trachea over a range from 0 to 162 ms, the following results were obtained:

TABLE 12

| | Order | | | | | | | |
|---|---|---|---|---|---|---|---|---|
| | 1 | 2 | 3 | 4 | 5 | 6 | 7 | 8 |
| Frequency (Hz) | 172.2 | 344.4 | 516.6 | 688.8 | 861 | 1033.2 | 1205.4 | 1377.6 |

<natural frequency: 172.2 Hz>

TABLE 13

| | Order | | | | | | | |
|---|---|---|---|---|---|---|---|---|
| | 1 | 2 | 3 | 4 | 5 | 6 | 7 | 8 |
| Frequency (Hz) | 159.4 | 318.8 | 478.2 | 637.6 | 797 | 956.4 | 1115.8 | 1275.2 |

<natural frequency: 159.4 Hz>

It can be seen that a shift from a second harmonic which is the fundamental tone of the intro peak frequencies to a first harmonic which is the fundamental tone of the outro peak frequencies was made.

(D) Case where Chickens have been Infected with an Avian Influenza

Chickens infected with avian influenza are classified into a type in which pain and screams occur and a type in which mental degradation occurs.

In order to measure the avian influenza sound of chickens, experiments were conducted on a total of four groups G1, G2, G3 and G4, each of the groups included ten specific-pathogen-free chickens (breed: White leg horn), and the experiments were conducted in a separate animal farm within a veterinary college.

The sounds of normal chickens and chickens infected with avian influenza were analyzed a per individual basis with distinctive scores assigned to individual chickens according to clinical signs per date. After the chickens had been inoculated with an avian influenza virus (H9N2) in the afternoon on Mar. 23, 2017, four to eight chickens exhibiting avian influenza-related infection signs (coughs, eye swelling, diarrhea, etc.) from the morning on a third day, i.e., Mar. 26, 2017, were classified as infected. G4 was a group which was not vaccinated. In G4, eight chickens, which was the largest number of chickens, exhibited clinical signs.

① Case where Mental Degradation has Occurred

Figure 9A:
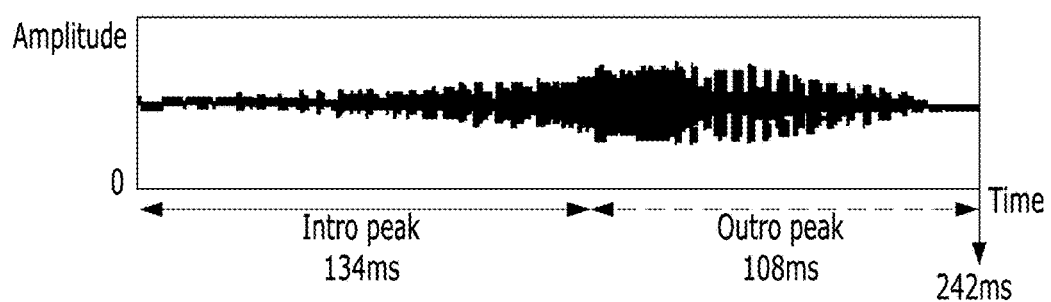
FIG. 9a is a graph showing the relationships between an intro peak frequency time span and an outro peak frequency time span, and amplitudes when mental degradation occurred.
Figure 9B:
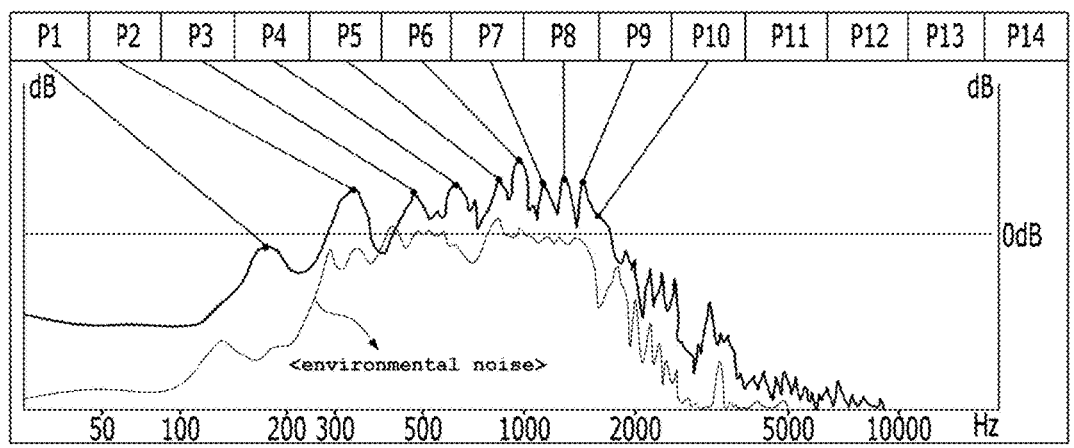
FIG. 9b is a graph showing measured intro peak frequencies.
Figure 9C:
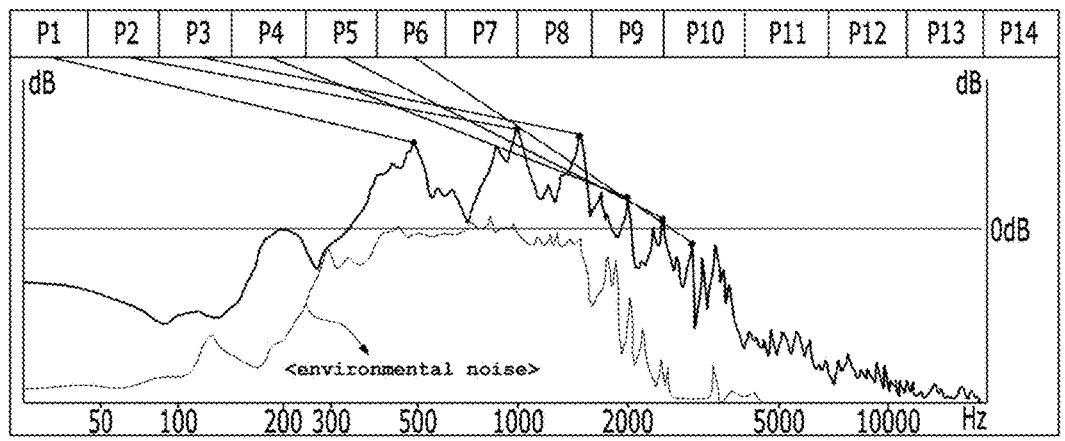
FIG. 9c is a graph showing measured outro peak frequencies.

FIG. 9a derived from the results of the experiments shows the relationships between an intro peak frequency time span from 0 to 134 ms and an outro peak frequency time span from 135 to 242 ms, and amplitudes. FIG. 9b is a graph showing intro peak frequencies which were measured when an environmental noise threshold value was set to 0.6 db, and FIG. 9c is a graph showing measured outro peak frequencies.

When a plurality of primary peak frequencies, i.e., ten intro peak frequencies and six outro peak frequencies, having the possibility of being used for sound analysis were selected from the graphs and sound levels and frequencies were measured at individual points, the following results were obtained:

TABLE 14

|  | P1 | P2 | P3 | P4 | P5 |
|---|---|---|---|---|---|
| Intro F. | −0.3 db | 3.4 db | 3.0 db | 3.5 db | 3.7 db |
|  | 162.8 Hz | 323.5 Hz | 485.95 Hz | 648.4 Hz | 811.7 Hz |

|  | P6 | P7 | P8 | P9 | P10 |
|---|---|---|---|---|---|
| Intro F. | 4.9 db | 3.7 db | 3.5 db | 3.4 db | 1.6 db |
|  | 972.4 Hz | 1134.0 Hz | 1295.4 Hz | 1460.1 Hz | 1622.5 Hz |

TABLE 15

|  | P1 | P2 | P3 | P4 | P5 | P6 |
|---|---|---|---|---|---|---|
| Outro F. | 5.8 db | 6.9 db | 6.5 db | 3.8 db | 2.2 db | 0.0 db |
|  | 486.0 Hz | 973.6 Hz | 1459.1 Hz | 1946.4 Hz | 2432.8 Hz | 2920.5 Hz |

Of the intro peak frequencies, the first peak frequency P1fi to the tenth peak frequency P10fi form an arithmetic progression, and the first peak frequency P1fi is a fundamental tone. The harmonic of a natural frequency corresponding to a first harmonic where the trachea resonated appeared distinctively.

Of the outro peak frequencies, the first peak frequency P1fo to the sixth peak frequency P6fo form an arithmetic progression, and the first peak frequency P1fo is a fundamental tone. The fundamental tone reached a third harmonic where the trachea resonated. The fact that the phenomenon in which a peak frequency shifts to a higher order harmonic of a harmonic series where the trachea resonates along a trajectory over time is not found in connect with the sound types of normal chickens. This frequency shift phenomenon is determined to be a unique sound type of avian influenza.

When the fundamental tone of the intro peak frequencies and the fundamental tone of the outro peak frequencies were compared with individual harmonics based on the natural frequency of the trachea over a range from 0 to 242 ms, the following results were obtained:

TABLE 16

| | Order | | | | | | | |
|---|---|---|---|---|---|---|---|---|
| | 1 | 2 | 3 | 4 | 5 | 6 | 7 | 8 |
| Frequency (Hz) | 162.8 | 325.6 | 488.4 | 651.2 | 814 | 976.8 | 1139.6 | 1302.4 |

<natural frequency: 162.8 Hz>

It can be seen that a shift from a first harmonic which is the fundamental tone of the intro peak frequencies to a third harmonic which is the fundamental tone of the outro peak frequencies was made.

② Case where Pain and Screams have Occurred

Figure 10A:
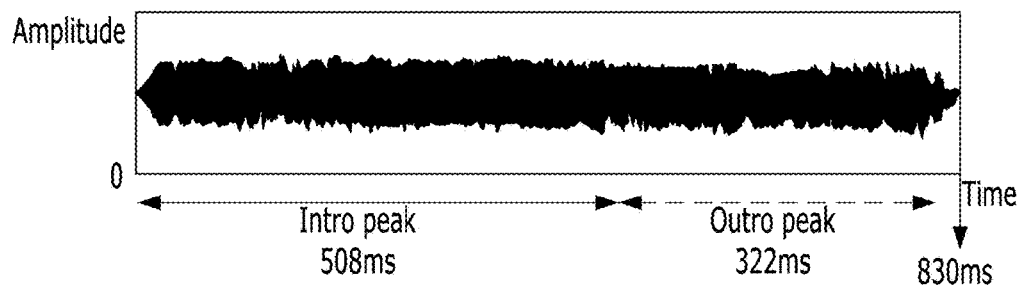
FIG. 10a is a graph showing the relationships between an intro peak frequency time span and an outro peak frequency time span, and amplitudes when span and screams occurred due to avian influenza.
Figure 10B:
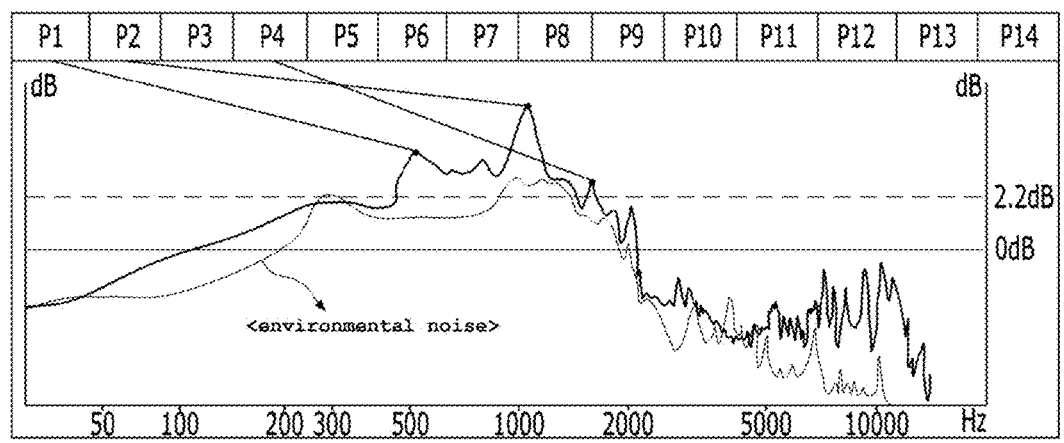
FIG. 10b is a graph showing measured intro peak frequencies.
Figure 10C:
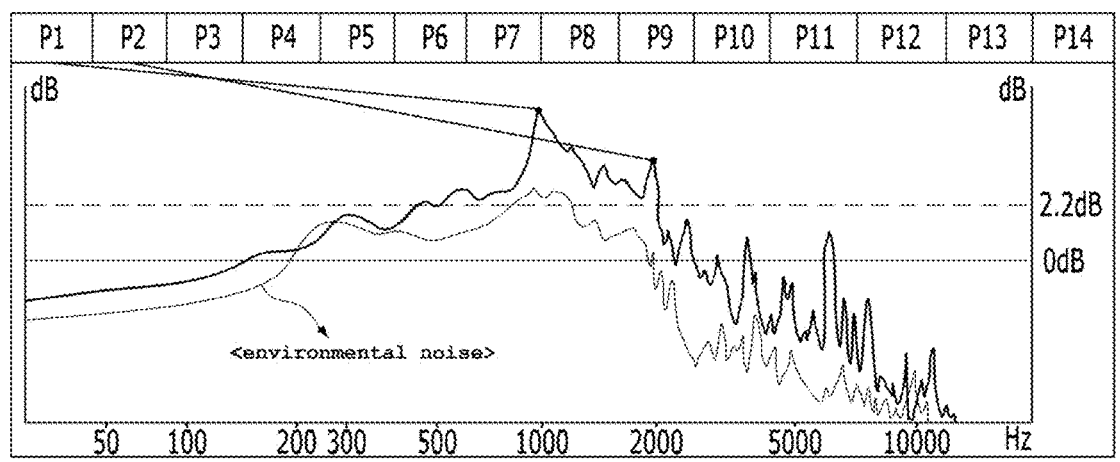
FIG. 10c is a graph showing measured outro peak frequencies.

FIG. 10a derived from the results of the same experiments shows the relationships between an intro peak frequency time span from 0 to 508 ms and an outro peak frequency time span from 509 to 830 ms, and amplitudes. FIG. 10b is a graph showing intro peak frequencies which were measured when an environmental noise threshold value was set to 2.2 db, and FIG. 10c is a graph showing measured outro peak frequencies.

When a plurality of primary peak frequencies, i.e., three intro peak frequencies and two outro peak frequencies, having the possibility of being used for sound analysis were selected from the graphs and sound levels and frequencies were measured at individual points, the following results were obtained:

TABLE 17

|  | P1 | P2 | P3 |
|---|---|---|---|
| Intro F. | 5.2 db<br>510.9 Hz | 7.5 db<br>1022.4 Hz | 3.7 db<br>1533.5 Hz |
| Outro F. | 7.8 db<br>1022.8 Hz | 5.8 db<br>2045.0 Hz | — |

Of the intro peak frequencies, the first peak frequency P1fi to the third peak frequency P3fi form an arithmetic progression, and the first peak frequency P1fi is a fundamental tone. The fundamental tone corresponds to a third harmonic where the trachea resonates, which is generated at the natural frequency of the trachea, i.e., 170 Hz.

Of the outro peak frequencies, the first peak frequency P1fo and the second peak frequency P2fo form an arithmetic progression, and the first peak frequency P1fo is a fundamental tone. In a state in which the natural frequency of a trachea is 170 Hz, the fundamental tone reaches a sixth harmonic where the trachea resonates.

The third harmonic and the sixth harmonic exhibit an interval difference of a perfect eighth octave. This interval can be generated through a change in breathing without a change to the state of the trachea. This is a sound type which appears in an extreme stress state accompanied by pain, and is one of the avian influenza diagnosis criteria along with metal degradation.

When the fundamental tone of the intro peak frequencies and the fundamental tone of the outro peak frequencies were compared with individual harmonics based on the natural frequency of the trachea over a range from 0 to 830 ms, the following results were obtained:

TABLE 18

|  | Order | | | | | | | |
|---|---|---|---|---|---|---|---|---|
|  | 1 | 2 | 3 | 4 | 5 | 6 | 7 | 8 |
| Frequency (Hz) | 170 | 340 | 510 | 680 | 850 | 1020 | 1190 | 1360 |

<natural frequency: 170.0 Hz>

It can be seen that a shift from a third harmonic which is the fundamental tone of the intro peak frequencies to a sixth harmonic which is the fundamental tone of the outro peak frequencies was made.

Although some embodiments of the present invention have been described based on chickens, the same results can be obtained from other birds having the same sound production structure, such as the same trachea. The embodiments of the present invention are intended merely to illustrate the present invention, but should not be construed as being intended to limit the range of the rights of the present invention.

For example, according to the present invention, a breed in which the number of individuals is the largest of all migratory birds or a breed which can be used for specific individual bird analysis may be selected in conjunction with wireless Internet-based national servers for the path tracking of migratory birds and/or the epidemiological analysis of avian influenza, a small-sized electronic tag including a GPS module and a communication module may be mounted on the neck or ankle region of each bird, information about the individual bird may be input to a computer, the characteristic sounds of an infected individual bird were obtained for each sound type from each habitat for migratory birds of each nation by using microphones, a relay, an MCAAD, etc., stored in a server and compared with the previously stored sounds of migratory birds, the sounds of the infected individual bird may be finally identified, and disease information may be shared among countries, thereby preventing infection with nation-based avian influenza from spreading.

Furthermore, the sounds of individual birds, environmental noise, behavioral noise, etc., the sounds of individual migratory birds, individual poultry, etc. classified according to their type, and normal individual sounds and abnormal individual sounds may be stored in the memory storage unit of the MCAAD, a platform environment optimized for an environment for the development of machine learning and deep learning may be constructed, and the stored data may be organized into big data by using various software libraries and application utilities and a supercomputer required for the development of a neural network-based artificial intelligence applications.

Furthermore, a multi channel audio analysis device (MCAAD) including an infrared camera may be installed at night.

The present invention has an advantage of providing the electronic harmonic algorithm which can compare, distinguish, and identify the sounds of individuals infected with animal diseases, including avian influenza, by means of a frequency peak detect (PFD) technique.

The present invention has an advantage of accurately determining the states of birds based on effective frequencies and fundamental tones by means of the system including the MCAAD.

It will be apparent that the above-described range of the rights of the present invention encompasses ranges which are the same as and equivalent to the following claims.

What is claimed is:

1. A system for identifying and diagnosing sounds of infected wild birds and poultry, the system comprising:
   a multi channel audio analysis device (MCAAD); and
   a sound collection unit connected to the MCAAD via a wired or wireless connection;
   wherein the sound collection unit collects sounds of birds via a plurality of microphones, and information about the collected sounds is transmitted to the MCAAD via a relay,
   wherein the MCAAD:
   receives the information about the sounds of the birds, filters out environmental noise, extracts effective frequencies, determines a current state of the birds by analyzing the effective frequencies, and transmits corresponding information to a main server when the current state is classified as an abnormal state:
   classifies frequencies in question as the effective frequencies when the frequencies in question exceed the environmental noise, and peak frequencies of the frequencies in question equal to or higher than a predetermined decibel form an arithmetic progression, or when the peak frequencies of the frequencies in question are identical to data previously stored in the MCAAD:
   determines a lowest one of the effective frequencies to be a fundamental tone;
   determines a state of the birds based on whether intro peak frequencies and outro peak frequencies extracted based on production time within a single syllable or phoneme in order to analyze the information about the sounds of the birds are produced while resonating at a specific harmonic of a natural harmonic series where a trachea of the birds resonates, or based on whether the intro peak frequencies and the outro peak frequencies resonate at different harmonics of the natural harmonic series where the trachea of the birds resonates; and determines the birds to be in a serene state when:

first and second peak frequencies of the intro peak frequencies form an arithmetic progression, and the first peak frequency which is a fundamental tone corresponds to a fourth harmonic of the natural frequency of the trachea of the birds; and first to sixth peak frequencies of the outro peak frequencies form an arithmetic progression, and the first peak frequency which is a fundamental tone corresponds to a fourth harmonic of the natural frequency of the trachea of the birds.

2. The system of claim 1, wherein the main server is connected to at least one of a smartphone, a radio, a computer terminal, a tablet personal computer (PC), and a personal digital assistant (PDA).

3. The system of claim 1, wherein the MCAAD:

(A) sets fundamental tones of the intro peak frequencies and the outro peak frequencies when the birds are in a normal state as reference fundamental tones;

(B) determines the birds to have been infected with a respiratory disease virus, such as an infectious bronchitis (IB) virus, a Newcastle disease (ND) virus, or an infectious laryngotracheitis (ILT) virus when fundamental tones of the intro peak frequencies and outro peak frequencies of the measured sounds of the birds are identical to each other and are all lower than the reference fundamental tones, respectively, or when a fundamental tone of the outro peak frequencies is lower than a fundamental tone of the intro peak frequencies and are all lower than the reference fundamental tones, respectively; and (C) determines the birds to have been infected with avian influenza when the fundamental tone of the outro peak frequencies is higher than the fundamental tone of the intro peak frequencies of the measured sounds of the birds and are all lower than the reference fundamental tones, respectively, or when the fundamental tone of the outro peak frequencies is higher than the fundamental tone of the intro peak frequencies by a perfect eighth octave or higher.

4. A system for identifying and diagnosing sounds of infected wild birds and poultry, the system comprising:

a multi channel audio analysis device (MCAAD); and a sound collection unit connected to the MCAAD via a wired or wireless connection;

wherein the sound collection unit collects sounds of birds via a plurality of microphones, and information about the collected sounds is transmitted to the MCAAD via a relay, wherein the MCAAD:

receives the information about the sounds of the birds, filters out environmental noise, extracts effective frequencies, determines a current state of the birds by analyzing the effective frequencies, and transmits corresponding information to a main server when the current state is classified as an abnormal state;

classifies frequencies in question as the effective frequencies when the frequencies in question exceed the environmental noise, and peak frequencies of the frequencies in question equal to or higher than a predetermined decibel form an arithmetic progression, or when the peak frequencies of the frequencies in question are identical to data previously stored in the MCAAD:

determines a lowest one of the effective frequencies to be a fundamental tone;

determines a state of the birds based on whether intro peak frequencies and outro peak frequencies extracted based on production time within a single syllable or phoneme in order to analyze the information about the sounds of the birds are produced while resonating at a specific harmonic of a natural harmonic series where a trachea of the birds resonates, or based on whether the intro peak frequencies and the outro peak frequencies resonate at different harmonics of the natural harmonic series where the trachea of the birds resonates; and determines the sounds of the birds to be normal loud sounds when:

first to eighth peak frequencies of the intro peak frequencies form an arithmetic progression, and the first peak frequency which is a fundamental tone corresponds to a fifth harmonic of a natural frequency of the trachea of the birds; and first to fifth peak frequencies of the outro peak frequencies form an arithmetic progression, and the first peak frequency which is a fundamental tone corresponds to a fourth harmonic of a natural frequency of the trachea of the birds.

5. A system for identifying and diagnosing sounds of infected wild birds and poultry, the system comprising:

a multi channel audio analysis device (MCAAD); and a sound collection unit connected to the MCAAD via a wired or wireless connection, wherein the sound collection unit collects sounds of birds via a plurality of microphones, and information about the collected sounds is transmitted to the MCAAD via a relay, wherein the MCAAD:

receives the information about the sounds of the birds, filters out environmental noise, extracts effective frequencies, determines a current state of the birds by analyzing the effective frequencies, and transmits corresponding information to a main server when the current state is classified as an abnormal state, classifies frequencies in question as the effective frequencies when the frequencies in question exceed the environmental noise, and peak frequencies of the frequencies in question equal to or higher than a predetermined decibel form an arithmetic progression, or when the peak frequencies of the frequencies in question are identical to data previously stored in the MCAAD:

determines a lowest one of the effective frequencies to be a fundamental tone, determines a state of the birds based on whether intro peak frequencies and outro peak frequencies extracted based on production time within a single syllable or phoneme in order to analyze the information about the sounds of the birds are produced while resonating at a specific harmonic of a natural harmonic series where a trachea of the birds resonates, or based on whether the intro peak frequencies and the outro peak frequencies resonate at different harmonics of the natural harmonic series where the trachea of the birds resonates; and determines the birds to have been infected with a respiratory disease virus, such as an infectious bronchitis (IB) virus, a Newcastle disease (ND) virus, or an infectious laryngotracheitis (ILT) virus when:

(A) first to third peak frequencies of the intro peak frequencies form an arithmetic progression in a state where difference between a higher-order peak frequency and a lower-order peak frequency is a reference fundamental tone, the first peak frequency corresponds to a third harmonic of a natural frequency of a trachea of the birds, the second peak frequency corresponds to a fourth harmonic of the natural frequency of the trachea of the birds, and the third peak frequency corresponds to a fifth harmonic of the natural frequency of the trachea of the birds; and first and second peak frequencies of the outro peak frequencies form an arithmetic progression in a state where a difference between a higher-order peak frequency and a lower-order peak frequency is a reference fundamental tone, the first peak frequency corresponds to a third harmonic of the natural frequency of the trachea of the birds, and the second peak frequency corresponds to a fourth harmonic of the natural frequency of the trachea of the birds; or (B) first to fifth peak frequencies of the intro peak frequencies form an arithmetic progression, and the first peak frequency which is a fundamental tone corresponds to a second harmonic of the natural frequency of the trachea of the birds; and first to twelfth peak frequencies of the outro peak frequencies form an arithmetic progression, and the first peak frequency which is a fundamental tone corresponds to a first harmonic of the natural frequency of the trachea of the birds.

6. A system for identifying and diagnosing sounds of infected wild birds and poultry, the system comprising:
a multi channel audio analysis device (MCAAD); and
a sound collection unit connected to the MCAAD via a wired or wireless connection;
wherein the sound collection unit collects sounds of birds via a plurality of microphones, and information about the collected sounds is transmitted to the MCAAD via a relay,
wherein the MCAAD:
receives the information about the sounds of the birds, filters out environmental noise, extracts effective frequencies, determines a current state of the birds by analyzing the effective frequencies, and transmits corresponding information to a main server when the current state is classified as an abnormal state;
classifies frequencies in question as the effective frequencies when the frequencies in question exceed the environmental noise, and peak frequencies of the frequencies in question equal to or higher than a predetermined decibel form an arithmetic progression, or when the peak frequencies of the frequencies in question are identical to data previously stored in the MCAAD:
determines a lowest one of the effective frequencies to be a fundamental tone;
determines a state of the birds based on whether intro peak frequencies and outro peak frequencies extracted based on production time within a single syllable or phoneme in order to analyze the information about the sounds of the birds are produced while resonating at a specific harmonic of a natural harmonic series where a trachea of the birds resonates, or based on whether the intro peak frequencies and the outro peak frequencies resonate at different harmonics of the natural harmonic series where the trachea of the birds resonates; and
determines the birds to be infected with avian influenza when:

(A) first to tenth peak frequencies of the intro peak frequencies form an arithmetic progression, and the first peak frequency which is a fundamental tone corresponds to a first harmonic of a natural frequency of the trachea of the birds, and first to sixth peak frequencies of the outro peak frequencies form an arithmetic progression, and the first peak frequency which is a fundamental tone corresponds to a third harmonic of a natural frequency of the trachea of the birds; or (B) first to third peak frequencies of the intro peak frequencies form an arithmetic progression, and the first peak frequency which is a fundamental tone corresponds to a third harmonic of a natural frequency of the trachea of the birds, and first and second peak frequencies of the outro peak frequencies form an arithmetic progression, and the first peak frequency which is a fundamental tone corresponds to a sixth harmonic of a natural frequency of the trachea of the birds.

7. The system of claim 2, wherein an avian influenza alarm application is installed on the smartphone, the radio, the computer terminal, the tablet PC, or the PDA which communicates with the main server.

* * * * *